United States Patent
Carlson et al.

(10) Patent No.: US 10,059,591 B2
(45) Date of Patent: Aug. 28, 2018

(54) METHOD OF PRODUCING GRAPHENE FROM A HYDROCARBON GAS AND LIQUID METAL CATALYSTS

(71) Applicant: EMPIRE TECHNOLOGY DEVELOPMENT LLC, Wilmington, DE (US)

(72) Inventors: William Brenden Carlson, Seattle, WA (US); Vincent Casasanta, III, Woodinville, WA (US); Feng Wan, Issaquah, WA (US); Bradley Kirk Roberts, Seattle, WA (US); Timothy Martin Londergan, Seattle, WA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 45 days.

(21) Appl. No.: 15/117,332

(22) PCT Filed: Feb. 7, 2014

(86) PCT No.: PCT/US2014/015320
§ 371 (c)(1),
(2) Date: Aug. 8, 2016

(87) PCT Pub. No.: WO2015/119618
PCT Pub. Date: Aug. 13, 2015

(65) Prior Publication Data
US 2016/0347618 A1 Dec. 1, 2016

(51) Int. Cl.
*C01B 32/184* (2017.01)
*C01B 31/04* (2006.01)
(Continued)

(52) U.S. Cl.
CPC .......... *C01B 31/0453* (2013.01); *B01J 23/04* (2013.01); *B01J 23/06* (2013.01); *B01J 23/08* (2013.01);
(Continued)

(58) Field of Classification Search
CPC ..... C01B 31/0453; B01J 27/232; B01J 23/08; B01J 23/18; B01J 23/04; B01J 37/0081;
(Continued)

(56) References Cited

U.S. PATENT DOCUMENTS 8,808,810 B2 8/2014 Veerasamy
2006/0062713 A1 3/2006 Sano et al.
(Continued)

FOREIGN PATENT DOCUMENTS

CN 102741164 A 10/2012

OTHER PUBLICATIONS

Ding, Guqiao, et al. "Chemical vapor deposition of graphene on liquid metal catalysts." Carbon 53 (2013): 321-326.*
(Continued)

*Primary Examiner* — Richard M Rump

(57) ABSTRACT

Methods of producing graphene, reaction chambers for forming graphene, and graphene sheets formed from the methods are described herein. A method may include adding at least one metal catalyst in a reaction chamber, adding at least one hydrocarbon gas in the reaction chamber, allowing the at least one metal catalyst and the at least one hydrocarbon gas to contact one another to produce a product, and dehydrogenating the product to produce the graphene.

32 Claims, 3 Drawing Sheets

(51) Int. Cl.

| | | |
|---|---|---|
| *B01J 23/04* | (2006.01) | |
| *B01J 23/06* | (2006.01) | |
| *B01J 23/08* | (2006.01) | |
| *B01J 23/18* | (2006.01) | |
| *B01J 23/755* | (2006.01) | |
| *B01J 35/12* | (2006.01) | |
| *B01J 37/00* | (2006.01) | |
| *B01J 27/232* | (2006.01) | |
| *C01B 32/186* | (2017.01) | |
| *B01J 23/30* | (2006.01) | |
| *B01J 23/60* | (2006.01) | |
| *B01J 23/66* | (2006.01) | |
| *B01J 23/80* | (2006.01) | |

(52) U.S. Cl.
CPC ............. *B01J 23/18* (2013.01); *B01J 23/755* (2013.01); *B01J 27/232* (2013.01); *B01J 35/12* (2013.01); *B01J 37/0081* (2013.01); *C01B 32/186* (2017.08); *B01J 23/30* (2013.01); *B01J 23/60* (2013.01); *B01J 23/66* (2013.01); *B01J 23/80* (2013.01)

(58) Field of Classification Search
CPC . B01J 23/06; B01J 23/755; B01J 35/12; B01J 23/80; B01J 23/60; B01J 23/30; B01J 23/66
See application file for complete search history.

(56) References Cited

U.S. PATENT DOCUMENTS

| | | |
|---|---|---|
| 2006/0062715 A1 | 3/2006 | Endo et al. |
| 2010/0021708 A1 | 1/2010 | Kong et al. |
| 2010/0099319 A1 | 4/2010 | Lashmore et al. |
| 2012/0034150 A1 | 2/2012 | Noyes |
| 2012/0107610 A1 | 5/2012 | Moravsky et al. |
| 2013/0022811 A1 | 1/2013 | Ahn et al. |
| 2013/0174968 A1 | 7/2013 | Vlassiouk et al. |
| 2013/0253249 A1 | 9/2013 | Baucherel |

OTHER PUBLICATIONS

Li, Zhancheng, et al. "Low-temperature growth of graphene by chemical vapor deposition using solid and liquid carbon sources." ACS nano 5.4 (2011): 3385-3390.*

Luo, Yufeng, et al., "Development of preparation techniques of two-dimensional graphene," Journal of Xinyu University, vol. 18, Issue No. 4, pp. 93-97 (Aug. 2013) (English Abstract), On merits of abstract only.

Ding et al., Chemical vapor deposition of graphene on liquid metal catalysts, Carbon (Mar. 2013), 53:321-326.

International Search Report and Written Opinion for International Application No. PCT/US2014/15320 dated Aug. 8, 2014.

Rummeli et al., Direct Low Temperature Nano-Graphene Synthesis over a Dielectric Insulator, ACS Nano (Jun. 29, 2010), 4(7):4206-4210.

* cited by examiner

METHOD OF PRODUCING GRAPHENE
FROM A HYDROCARBON GAS AND LIQUID
METAL CATALYSTS

CROSS-REFERENCE TO RELATED APPLICATION

This patent application is a U.S. National Stage filing under 35 U.S.C. § 371 of International Patent Application No. PCT/US2014/015320, filed on Feb. 7, 2014, and entitled "METHOD OF PRODUCING GRAPHENE FROM A HYDROCARBON GAS AND LIQUID METAL CATALYSTS", the entire disclosure of which is incorporated herein by reference in its entirety.

BACKGROUND

Due to its thin, lightweight, flexible and durable properties, graphene has enjoyed a wide range of applications. For example, graphene has been used in biological engineering, optical electronics, ultrafiltration, composite materials, photovoltaic cells, energy storage devices, and/or the like.

Recent discoveries of the potential applications of graphene have spurred increased interest in developing large scale graphene manufacturing applications that produce graphene that is free or substantially free of defects, such as graphite deposits on the graphene sheet. Previous methods included cutting blocks of graphite into the thin graphene sheets. Such methods included obtaining a thin graphene sheet by placing an adhesive substrate (such as tape) against the graphite and removing the graphene. While such methods may be useful for analysis, they may not be suitable for large scale graphene manufacturing because of the small amount of graphene that is obtained.

Other methods have involved oxidizing graphite to produce graphene oxide, which is then solubilized. The graphene oxide is precipitated to produce sheets of graphene. However, these methods result in flawed graphene sheets because bergs of graphite are present on the graphene sheet. Accordingly, the graphene sheet is not free of defects.

Other methods include sonicating and centrifuging graphite to yield graphene, forming epitaxial graphene on diamond surfaces, forming epitaxial graphene on metal surfaces, and decomposing the surface of silicon carbide. However, each of these methods results in graphene sheets that have defects and/or are not suited for large scale use.

SUMMARY

In an embodiment, a method of producing graphene may include adding at least one metal catalyst in a reaction chamber, adding at least one hydrocarbon gas in the reaction chamber, allowing the at least one metal catalyst and the at least one hydrocarbon gas to contact one another to produce a product, and dehydrogenating the product to produce the graphene.

In an embodiment, a reaction chamber for use in forming graphene may include a chamber body, at least one inlet configured to deliver at least one metal catalyst and at least one hydrocarbon gas to the chamber body, at least one outlet configured to remove the at least one metal catalyst from the chamber body, and a porous substrate positioned inside the chamber body between the inlet and the outlet.

In an embodiment, a method of producing graphene may include combining at least one metal catalyst with an additive, adding the at least one metal catalyst and the additive into a reaction chamber, evacuating any gas in the reaction chamber, adding at least one hydrocarbon gas into the reaction chamber, adding a solvent into the reaction chamber, heating the reaction chamber, allowing the at least one metal catalyst and the at least one hydrocarbon gas to contact one another to produce a product, dehydrogenating the product to produce the graphene, removing the at least one metal catalyst from the reaction chamber, removing the solvent from the reaction chamber; and collecting the graphene on a porous substrate in the reaction chamber.

In an embodiment, a graphene sheet may be prepared by a process. The process may include the steps of adding at least one metal catalyst in a reaction chamber, adding at least one hydrocarbon gas in the reaction chamber to cause a cycloaddition reaction at an interface between the at least one metal catalyst and the at least one hydrocarbon gas to produce a product, and causing a dehydrogenation of the product to produce the graphene. The graphene sheet may contain substantially no defects.

DETAILED DESCRIPTION

Figure 1:
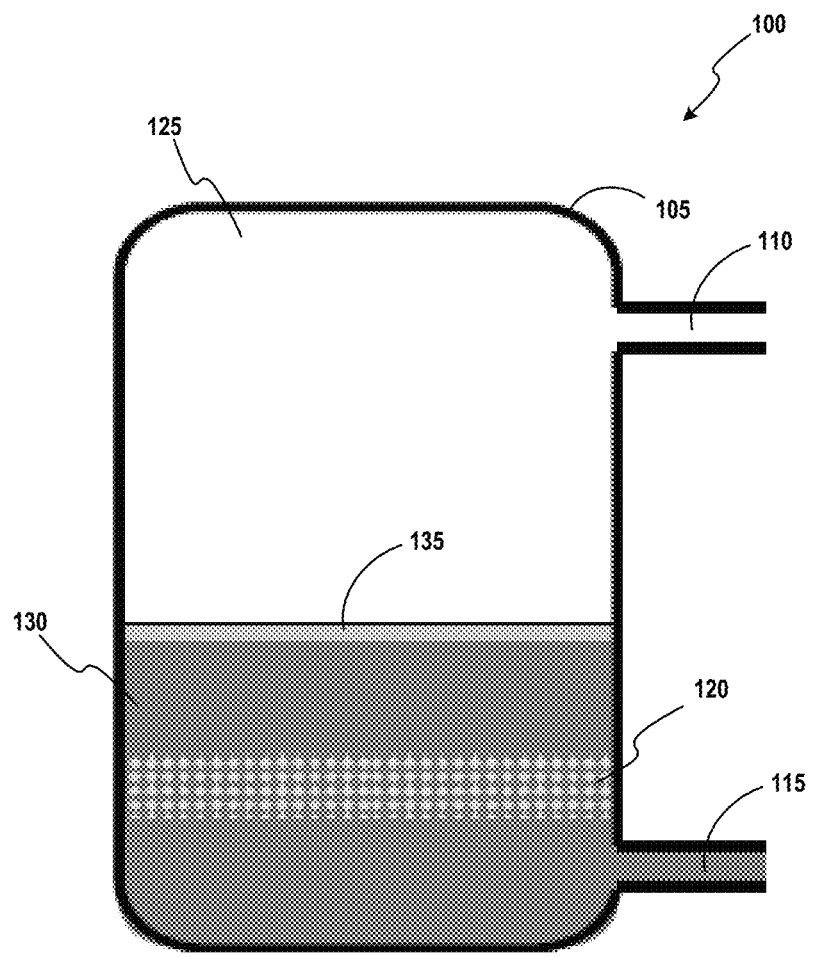
FIG. 1 depicts a cutaway side view of an illustrative reaction chamber according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, "graphene" refers an allotrope of carbon that includes a repeating structure of carbon atoms in a hexagonal arrangement. Because of the structural arrangement of carbon atoms, graphene occurs in planar form called a graphene sheet. When a plurality of graphene sheets are stacked, the substance is called graphite. Each carbon atom in the hexagonal plane is doubly bonded to another carbon atom, which gives graphene unique properties. For example, graphene is highly conductive along the plane and conductive between planes with higher resistance because it is hyper-conjugated. In addition, because graphene is hyper-conjugated, it has no band gap. This lack of band gap means that all wavelengths of light can induce the photo-electron effect. The lack of a band gap makes graphene a candidate for use in photovoltaic cells because it can absorb photons with energy at every frequency. Thus, photons of different frequencies of light are converted to electrons with matching energy levels. This unique structure of graphene provides a potential application in transparent electrodes, memory storage, barrier materials, and high strength materials. However, for the graphene to be effective as described herein, it must be a pure graphene sheet. In addition, certain applications may require large sheets of graphene to be effective.

As used herein, "pure graphene" refers to a graphene sheet that is free or substantially free of defects. Defects may include at least one impurity, such as, for example graphite deposits. The impurities may include heptagonal and pentagonal hydrocarbon structures, hetero atoms in the graphene structure, oxygen in the graphene structure, nitrogen in the graphene structure, and various locations where a C=C bond is hydrogenated.

The present disclosure relates generally to a method of forming graphene from a metal catalyst and a hydrocarbon gas. The method may generally include dehydrogenizing the metal catalyst and the hydrocarbon gas resulting from cycloaddition reactions at a low temperature. Graphene may form on the metal catalyst, which is subsequently drained through a porous substrate. The resulting graphene, which is large and free (or substantially free) of defects, may be collected from the porous substrate.

FIG. 1 depicts an illustrative reaction chamber, generally designated 100, that may be used to produce graphene according to an embodiment. The reaction chamber 100 may generally include a chamber body 105 having at least one inlet 110, at least one outlet 115, and a porous substrate 120 therein. Those with ordinary skill in the art will recognize that the reaction chamber 100 may have any suitable number of inlets 110 and outlets 115, particularly for certain embodiments described herein. Thus, the number of inlets 110 and the number of outlets 115 are not limited by this disclosure. However, for purposes of simplicity, the reaction chamber 100 will be described herein as having a single inlet 110 and a single outlet 115.

The reaction chamber 100 may generally be configured to contain at least one material therein. For example, in some embodiments, the reaction chamber 100 may be configured to receive at least one metal catalyst and/or at least one hydrocarbon gas therein, as described in greater detail herein. In some embodiments, the reaction chamber 100 may be configured to contain the graphene produced therein, as described in greater detail herein. In some embodiments, the reaction chamber 100 may be configured to receive at least one pressurized ingredient therein. For example, the reaction chamber 100 may be configured to receive a pressurized gas therein. Thus, the reaction chamber 100 may be configured to withstand high pressures and thus may be constructed of a material suitable for high pressure applications, such as, for example, steel, iron, and/or the like.

In some embodiments, the reaction chamber 100 may be configured to be adjusted to a particular temperature. For example, the temperature may be adjusted to ensure a reaction of the various ingredients contained within the reaction chamber 100. Thus, the reaction chamber 100 may include any number of heating elements, cooling elements, and/or the like located at various locations in, on, and/or adjacent to the reaction chamber to adjust the temperature. For example, the reaction chamber 100 may include a heated jacket. Illustrative temperatures to which the reaction chamber 100 may be adjusted include, but are not limited to, about 300° C. to about 400° C. For example, the reaction chamber 100 may be adjusted to a temperature of about 300° C., about 310° C., about 320° C., about 330° C., about 340° C., about 350° C., about 360° C., about 370° C., about 380° C., about 390° C., about 400° C., or any value or range between any two of these values (including endpoints).

The reaction chamber 100 may further be any shape and/or size and may have any internal volume. Accordingly, shapes, sizes, and internal volumes are not limited by this disclosure. Illustrative internal volumes of the reaction chamber 100 may be, but are not limited to, about 100 ml to about 100 L. For example, the internal volume may be about 100 ml, about 500 ml, about 1 L, about 2 L, about 5 L, about 10 L, about 25 L, about 50 L, about 75 L, about 100 L, or any value or range between any two of these values (including endpoints).

In some embodiments, the reaction chamber 100 may be configured to agitate and/or mix the ingredients placed therein. Accordingly, for example, the reaction chamber may include an agitation apparatus therein. In another example, the reaction chamber may be configured to be shaken or otherwise agitated by an external device.

The inlet 110 may generally be configured to deliver one or more ingredients to the chamber body 105. In some embodiments, the inlet 110 may be configured to provide one or more gaseous ingredients 125 to the chamber body 105. In some embodiments, the inlet 110 may be configured to provide one or more liquid, semiliquid, and/or molten ingredients 130 to the chamber body 105. For example, the inlet 110 may be configured to deliver at least one metal catalyst, at least one hydrocarbon gas, at least one additive, at least one solvent, at least one inert gas, and/or at least one reducing agent to the chamber body 105. Thus, the inlet 110 may be connected to a supply that provides at least one of the above-mentioned ingredients to the inlet. In some embodiments, the inlet 110 may also be configured to evacuate a space inside the chamber body 105. Thus, the inlet 110 may be connected, for example, to a vacuum or the like.

The size and shape of the inlet 110 is not limited by this disclosure, and may generally be any size and/or shape. Those with ordinary skill in the art will recognize inlet sizes and shapes that are suitable for delivering the various ingredients to the chamber body 105. Similarly, the location of the inlet 110 is not limited by this disclosure, and may be located at any suitable location on the chamber body 105. For example, in some embodiments, the inlet 110 may generally be located in a top portion of the chamber body 105. In other embodiments, the inlet 110 may generally be located in a bottom portion of the chamber body. In some embodiments, the inlet 110 may be positioned relative to the ingredients located within the chamber body 105. For example, the inlet 110 may be located near a top portion of the chamber body to properly deliver the various ingredients, which will fall under force of gravity towards a bottom portion of the chamber body. In some embodiments, the inlet 110 may be spaced relative to the outlet 115 and/or the porous substrate 120. Thus, for example, the porous substrate 120 may act as a divider between the location of the inlet 110 and the location of the outlet 105 in the chamber body 105.

The outlet 115 may generally be configured to remove one or more items from the chamber body 105. Thus, the outlet 115 may function as a drain and/or a release valve. For example, the outlet 115 may be configured to remove at least one metal catalyst from the chamber body 105. Thus, the outlet 115 may be connected to a conduit or the like that is configured to remove the at least one metal catalyst from the outlet.

The size and shape of the outlet 115 is not limited by this disclosure, and may generally be any size and/or shape. Those with ordinary skill in the art will recognize outlet sizes and shapes that are suitable for removing the at least one metal catalyst from the chamber body 105. Similarly, the location of the outlet 115 is not limited by this disclosure, and may be located at any suitable location on the chamber body 105. For example, in some embodiments, the outlet 115 may generally be located in a bottom portion of the chamber body 105. In other embodiments, the outlet 115 may generally be located in a top portion of the chamber body. In some embodiments, the outlet 115 may be positioned relative to the ingredients located within the chamber body 105. For example, when the outlet 115 is configured to remove a liquid, such as the at least one metal catalyst, from the chamber body 105, it may be located near a bottom portion of the chamber body such that it can effectively drain the at least one metal catalyst under force of gravity. In some embodiments, the outlet 115 may be spaced relative to the inlet 110 and/or the porous substrate 120.

As previously described herein, the porous substrate 120 may generally be located within the chamber body 105. The porous substrate 120 may be positioned within the chamber body 105 such that it can retain graphene 135 produced from the method described herein while allowing various other ingredients to flow through. For example, when various ingredients, such as the metal catalyst, are drained from the chamber body 105 via the outlet 115, the metal catalyst may flow through the porous substrate and out via the outlet, while the graphene 135 dispersed within the metal catalyst is retained by the porous substrate and prevented from flowing out of the reaction chamber 100 via the outlet. In some embodiments, to ensure that the porous substrate 120 effectively catches the graphene 135, it may be permanently or semi-permanently affixed to the chamber body 105 such that it remains immobile when various ingredients are inserted in to the chamber body, ejected from the chamber body, heated, reacted, and/or the like.

In various embodiments, the porous substrate 120 may be positioned within the chamber body 105 such that it is substantially horizontal with respect to a bottom surface of the pressure chamber 100. Such a positioning may ensure, for example, that the graphene is retained by the porous substrate in a manner such that it can be removed from the chamber body 105 without being damaged.

The porous substrate 120 may generally be constructed of any porous material. In particular, the porous substrate 120 may be constructed of porous materials that are suited for the purposes described herein. Thus, the porous materials may be such that they retain graphene 135 while allowing other materials to pass therethrough. In addition, the porous materials may be selected such that they do not react with the various ingredients described herein. An illustrative porous substrate 120 may be made of glass. Other illustrative porous substrates 120 may be made of silicon or silicon-based materials.

Figure 2:
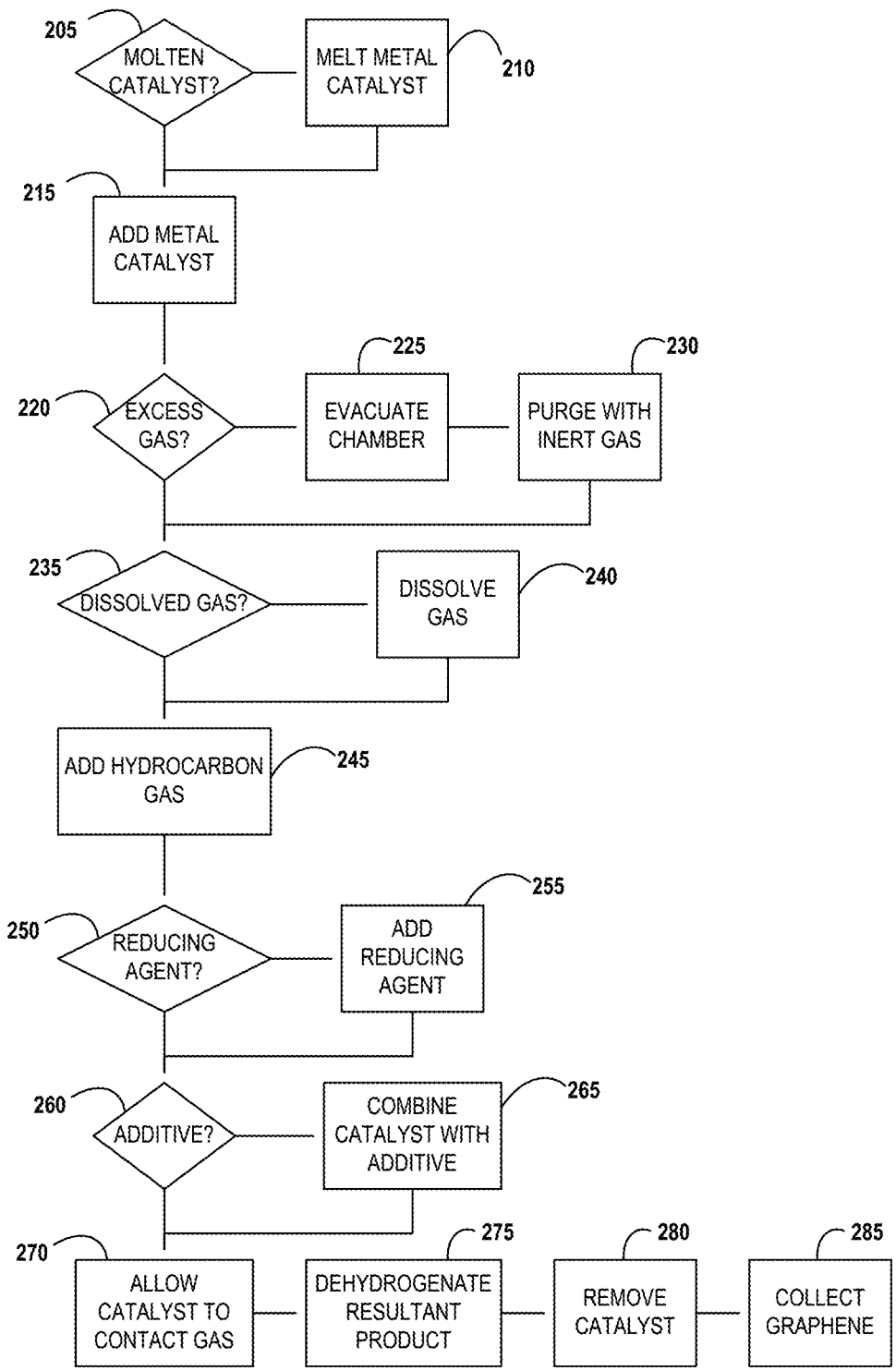
FIG. 2 depicts a flow diagram of an illustrative method of producing graphene according to a first embodiment.

FIG. 2 depicts an illustrative method of producing graphene according to a first embodiment. The method may include adding 215 at least one metal catalyst to the reaction chamber. As described herein, the metal catalyst may generally be added via the inlet. The amount of metal catalyst is not limited by this disclosure, and may generally be an amount sufficient to undergo the reaction described herein. Thus, in some embodiments, the amount of metal catalyst may be sufficient to ensure a particular ratio of metal catalyst to hydrocarbon gas in the reaction chamber.

In some embodiments, a determination 205 may be made as to whether the metal catalyst is to be molten before inserted into the reaction chamber. The determination 205 may be made if the metal catalyst is not a liquid metal catalyst. In some embodiments, a liquid or a molten metal catalyst may be necessary to ensure the metal catalyst can be strained through the porous substrate, as described in greater detail herein. If the metal catalyst is not in a liquid form, the metal catalyst may be melted 210 and added 215 to the reaction chamber. In some embodiments, the metal catalyst may be melted 210 to produce a molten metal catalyst before it is added 215 to the reaction chamber. In other embodiments, the metal catalyst may be melted 210 after it is added 215 to the reaction chamber, such as, for example, by heating the reaction chamber. In some embodiments, the metal catalyst may be melted 210 before it is allowed 270 to contact with a hydrocarbon gas, as described in greater detail herein.

The metal catalyst may generally be any material containing a metal and configured to catalyze a chemical reaction, as described in greater detail herein. In some embodiments, the metal catalyst may include, but is not limited to, mercury, bismuth, cesium, gallium, nickel, silver, an alloy thereof, or a combination thereof. In some embodiments, the metal catalyst may be an alloy. In some embodiments, the metal catalyst may include an alloy. In some embodiments, the alloy may have a melting point equal to or less than about 150° C. For example, the alloy may have a melting point of about 150° C., about 140° C., about 130° C., about 120° C., about 110° C., about 100° C., about 90° C., about 80° C., about 70° C., about 60° C., about 50° C., about 40° C., about 30° C., about 20° C., about 10° C., about 0° C., about −10° C., or lower, including any value or range between any two of these values. Such a low melting point may ensure that the reaction as described herein can be completed at a low temperature. Illustrative alloys may include, for example, a Wood's metal, a Rose's metal, a Field's metal, cerrosafe, cerrolow, and/or the like. The Wood's metal may generally be a eutectic, fusible alloy having a melting point of about 70° C. and containing about 50% bismuth, about 26.7% lead, about 13.3% tin, and about 10% cadmium by weight. The Rose's metal may be an alloy of about 50% bismuth, about 25% to about 28% lead, and about 22% to about 25% tin by weight. The Rose's metal may also have a melting point of about 94° C. to about 98° C. The Field's metal may be a eutectic alloy of about 32.5% bismuth, about 51% indium, and about 16.5% tin by weight. The Field's metal may also have a melting point of about 62° C. Cerrosafe may be an alloy of about 42.5% bismuth, about 37.7% lead, about 11.3% tin, and about 8.5% cadmium by weight. Cerrosafe may have a melting point of about 74° C. Cerrolow may be an alloy of about 44.7% to about 49% bismuth, about 18% to about 22.6% lead, about 8.3% to about 12% tin, about 19.1% to about 21% indium, and about 0% to about 5.3% cadmium by weight. The melting point of cerrolow may be about 47.2° C. to about 58° C. In some embodiments, the metal catalyst may be an amalgam. In some embodiments, the metal catalyst may include an amalgam. Illustrative amalgams may include mercury and at least one other ingredient. Illustrative other ingredients include, but are not limited to, bismuth, potassium, lithium, sodium, rubidium, cesium, magnesium, calcium, strontium, barium, copper, silver, gold, platinum, nickel, palladium, cobalt, rhodium, iridium, iron, ruthenium, rhenium, wolfram, and/or the like.

In various embodiments, a determination 220 may be made as to whether excess gas exists in the reaction chamber. Excess gas may be undesired because of a potential to interfere with the various chemical reactions described herein to produce graphene. In addition, excess gas may be undesired because it consumes a portion of the volume of the reaction chamber, and the various other ingredients may not be able to be inserted in the reaction chamber until the excess gas is removed. If excess gas is in the reaction chamber, the method may include evacuating 225 the gas from the reaction chamber. Evacuating 225 the gas from the reaction chamber may include placing a vacuum in fluid connection with the inlet and/or the outlet to remove the gas. Alternatively or additionally, the reaction chamber may be purged 230 with at least one inert gas. Illustrative inert gases may include, but are not limited to, helium, neon, argon, krypton, xenon, nitrogen, sulfur hexafluoride, silicon tetrafluoride, and/or the like. As previously described herein, the inert gas may be introduced to the reaction chamber via the inlet.

In various embodiments, a determination 235 may be made as to whether a hydrocarbon gas should be a dissolved hydrocarbon gas. In some embodiments, the hydrocarbon gas may be a dissolved hydrocarbon gas so that it can be added 245 to the reaction chamber, as described herein. In some embodiments, the hydrocarbon gas may be dissolved to ensure proper reaction with the metal catalyst, as described in greater detail herein. For example, acetylene may be dissolved in ethane. If a dissolved hydrocarbon gas is desired, the method may include dissolving 240 the hydrocarbon gas in a solvent. Illustrative solvents may include, but are not limited to, ethylene glycol, diethylene glycol, triethylene glycol, tetraethylene glycol, glycerol, sorbitol, erythritol, threitol, arabitol, xylitol, ribitol, mannitol, galactitol, fucitol, iditol, inositol, dimethyl carbonate, diethyl carbonate, propylene carbonate, ethylene carbonate, and/or a combination thereof. In some embodiments, the hydrocarbon gas may be dissolved 240 such that there is a particular ratio of hydrocarbon gas to solvent. The ratio is not limited by this disclosure, and may generally be any ratio, particularly ratios recognized by those with ordinary skill in the art as being suitable for carrying out the reactions described herein. Illustrative ratios may include, but are not limited to, about 0.01 M, about 0.1 M, about 0.25 M, about 0.5 M, about 0.75 M, about 1.0 M, or any value or range between any two of these values (including endpoints).

The method may further include adding 245 the hydrocarbon gas to the reaction chamber. Adding 245 the hydrocarbon gas may include inserting the hydrocarbon gas via the inlet, as described in greater detail herein. In some embodiments, the hydrocarbon gas may be a compressed hydrocarbon gas. Illustrative hydrocarbon gases may include, but are not limited to, methane, ethane, ethyne, ethene, carbon monoxide, ethanol, propane, butane, butadiene, pentane, pentene, cyclopentadiene, hexane, cyclohexane, benzene, toluene, carbon dioxide, chloromethane, dichloromethane, chloroform, bromomethane, dibromomethane, bromoform, iodo methane, diodomethane, iodoform, carbon tetrachloride, carbon tetrabromide, and/or a combination thereof.

Once the hydrocarbon gas has been added 245 to the reaction chamber, a determination 250 may be made as to whether a reducing agent is desired. The reducing agent may be necessary to provide electrons for the chemical reaction. If a reducing agent is desired, it may be added 255 to the reaction chamber. For instance, the reducing agent may be added via the inlet, as described in greater detail herein. Illustrative reducing agents that may be suitable for the reaction described herein may include, but are not limited to, methane, ethane, propane, butane, pentane, hexane, hydrogen, lithium, sodium, potassium, rubidium, cesium, magnesium, and/or a combination thereof. Any amount of reducing agent may be added 255, particularly amounts recognized by those with ordinary skill in the art as being suitable for the various reactions described herein.

In some embodiments, prior to contacting 270 the metal catalyst with the hydrocarbon gas, a determination 260 may be made as to whether an additive should be combined with the metal catalyst. An additive may be necessary, for example, as an additional catalyst for the chemical reaction. Illustrative additives may include, but are not limited to, sodium carbonate, potassium nitrate, lithium carbonate, potassium carbonate, rubidium carbonate, cesium carbonate, magnesium carbonate, lithium nitrate, sodium nitrate, rubidium nitrate, cesium nitrate, magnesium nitrate, calcium nitrate, strontium nitrate, barium nitrate, zinc nitrate, lead nitrate, copper nitrate, iron nitrate, chromium nitrate, cobalt nitrate, nickel nitrate, titanium nitrate, lithium nitrite, sodium nitrite, rubidium nitrite, cesium nitrite, magnesium nitrite, calcium nitrite, strontium nitrite, barium nitrite, zinc nitrite, lead nitrite, copper nitrite, iron nitrite, chromium nitrite, cobalt nitrite, nickel nitrite, titanium nitrite, lithium chlorite, sodium chlorite, rubidium chlorite, cesium chlorite, magnesium chlorite, calcium chlorite, strontium chlorite, barium chlorite, zinc chlorite, lead chlorite, copper chlorite, iron chlorite, chromium chlorite, cobalt chlorite, nickel chlorite, titanium chlorite, lithium hypochlorite, sodium hypochlorite, rubidium hypochlorite, cesium hypochlorite and magnesium hypochlorite, calcium chlorite, strontium chlorite, barium chlorite, zinc chlorite, lead chlorite, copper chlorite, iron chlorite, chromium chlorite, cobalt chlorite, nickel chlorite, titanium chlorite, lithium hypochlorite, sodium hypochlorite, rubidium hypochlorite, cesium hypochlorite, magnesium hypochlorite, calcium hypochlorite, strontium hypochlorite, barium hypochlorite, zinc hypochlorite, and/or a combination thereof. The amount of additive is not limited by this disclosure, and may generally be any amount, particularly amounts recognized as being suitable for carrying out the various reactions described herein.

The metal catalyst may be allowed 270 to contact the hydrocarbon gas to react and produce a product. The reaction may generally be a cycloaddition reaction, such as, for example, a (2+2+2) cycloaddition reaction. The general chemical formula for a (2+2+2) cycloaddition reaction is:

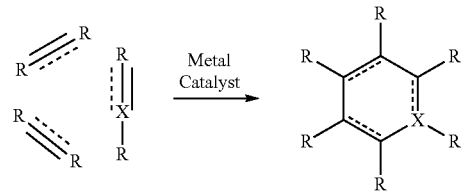

In some embodiments, to ensure that the hydrocarbon gas and the metal catalyst react when allowed 270 to contact, it may be necessary to ensure a proper reaction temperature. Accordingly, the reaction chamber may be adjusted such that it is at a temperature of about 300° C. to about 400° C. For example, the reaction chamber may be heated to about 300° C., about 310° C., about 320° C., about 330° C., about 340° C., about 350° C., about 360° C., about 370° C., about 380° C., about 390° C., about 400° C., or any value or range between any two of these values (including endpoints). In particular embodiments, the reaction temperature may be about 325° C. Such a temperature is considerably lower than conventional temperatures used to form graphene sheets. In some embodiments, the (2+2+2) cycloaddition reaction may be completed, for example, at room temperature (for example, about 20° C. to about 24° C.) and a dehydrogenation reaction may occur at the about 300° C. to about 400° C. temperature. To ensure sufficient reaction of the various ingredients, the reaction chamber may be heated to the temperature for a particular period of time. Non-limiting, illustrative periods of time may include about 5 minutes to about 5 hours. For example, the reaction chamber may be heated for about 5 minutes, about 10 minutes, about 15 minutes, about 30 minutes, about 45 minutes, about 60 minutes, about 90 minutes, about 2 hours, about 3 hours, about 4 hours, about 5 hours, or any value or range between any two of these values (including endpoints). In some embodiments, after the reaction chamber is heated, it may be allowed to cool to a particular temperature. One non-limiting illustrative example may be about room temperature (about 20° C. to about 24° C.).

In various embodiments, an interface between the hydrocarbon gas and the metal catalyst may exist when the ingredients are allowed 270 to contact one another. Such an interface may be a substantially horizontal surface with respect to a bottom surface of the reaction chamber. A substantially horizontal interface may be necessary to ensure that the resulting graphene sheet is not larger than the reaction chamber so that the graphene sheet may be removed from the reaction chamber without damage. If the interface is not substantially horizontal, the graphene sheet may grow too large and may have to be divided for removal from the reaction chamber. In some embodiments, it may be desirable to allow the interface to not be substantially horizontal so that the graphene sheet grows large and is divided for removal from the reaction chamber. A substantially horizontal interface may generally be achieved by ensuring that the reaction chamber is positioned in an upright orientation such that it is perpendicular to the direction of gravitational force. The interface may further allow for a separation of the metal catalyst from the hydrocarbon gas as the graphene forms such that the graphene only forms on the liquid metal surface of the metal catalyst, thereby further ensuring a pure graphene sheet free of defects.

The resulting product from the reaction between the metal catalyst and the hydrocarbon gas may be dehydrogenated 275 as a part of the reaction to remove excess hydrogen and produce the graphene sheets. Dehydrogenation 275 may allow for the formation of C-C bonds to produce the graphene sheets. As previously described herein, the dehydrogenation 275 may be completed at a temperature of about 300° C. to about 400° C. The metal catalyst may be removed 280 from the reaction chamber. In some embodiments, the metal catalyst may be removed 280 via the outlet, as described in greater detail herein. Removing 280 the metal catalyst may further include straining the metal catalyst through the porous substrate such that the graphene dispersed in the metal catalyst is captured by the porous substrate. In some embodiments, to ensure complete removal 280 of the metal catalyst, an inert gas may be added to the reaction chamber to drive the metal catalyst out of the reaction chamber. As previously described herein, the inert gas may be inserted via the inlet.

The resulting graphene sheet may be collected 285 from the porous substrate and removed from the chamber. In some embodiments, the graphene sheet may be pure, as described in greater detail herein. Accordingly, the graphene sheet may contain little or no graphite deposits thereon. Collection 285 of the graphene on the porous substrate may further eliminate a need for a transfer to a substrate, as conventionally required. Elimination of such a step may further eliminate damage and/or collection of defects on the graphene sheet.

Figure 3:
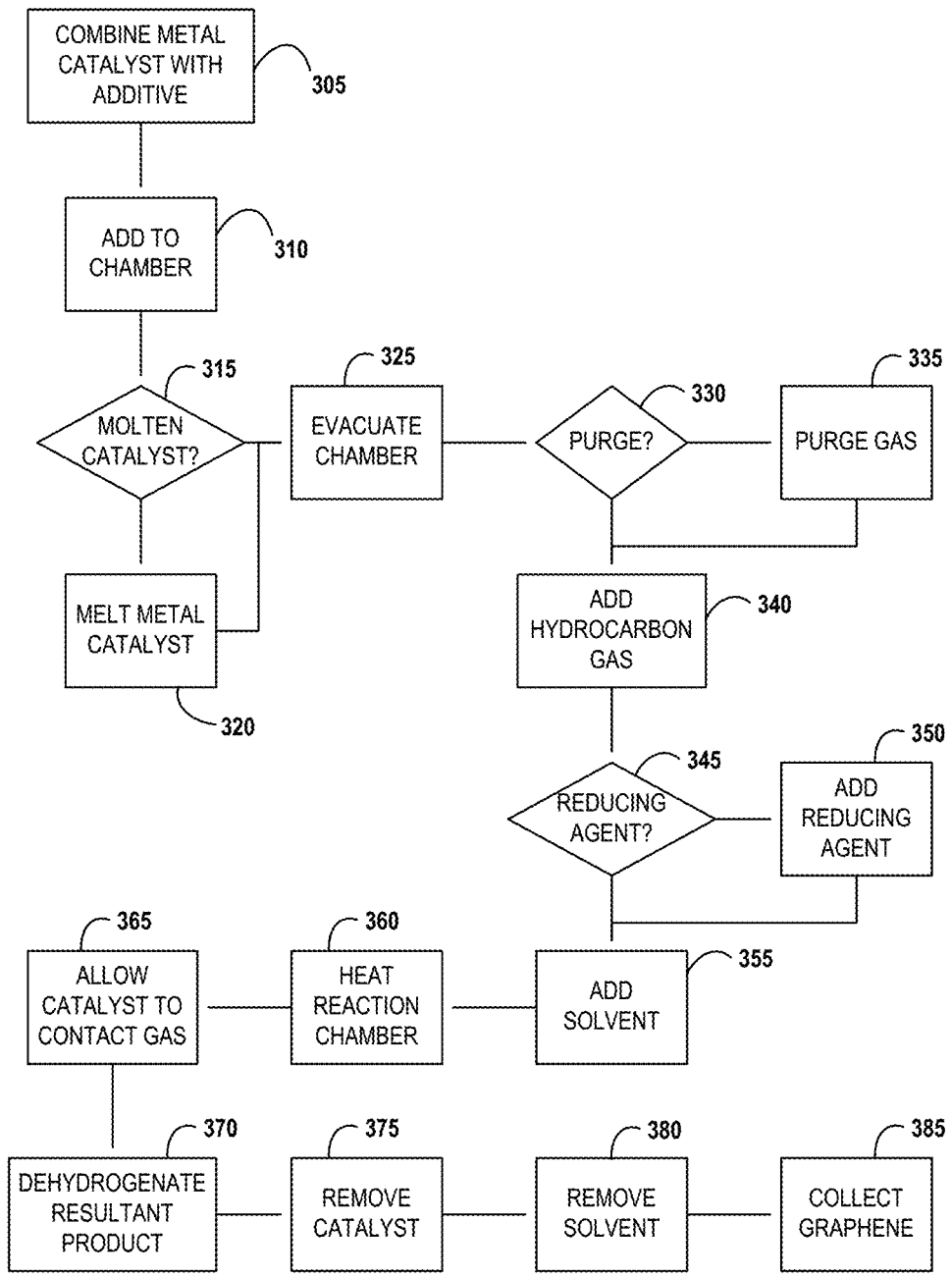
FIG. 3 depicts a flow diagram of an illustrative method of producing graphene according to a second embodiment.

FIG. 3 depicts a flow diagram of an illustrative method of producing graphene according to a second embodiment. The method may generally include combining 305 the metal catalyst with an additive. The additive may generally be an additional catalyst, as described in greater detail herein. The combined metal catalyst and additive may be added 310 to the reaction chamber.

As previously described herein, the metal catalyst (and the additive) must be in liquid form. Therefore, a determination 315 may be made as to whether the metal catalyst and the additive are liquid. If they are not, they may be melted 320 to a molten form.

The reaction chamber may be evacuated 325 of any and all gas contained therein. Accordingly, only the metal catalyst and the additive may remain in the reaction chamber. In some embodiments, to further ensure all gas has been removed, a determination 330 may be made as to whether the reaction chamber should be purged. If so, the remaining gas in the reaction chamber may be purged 335 with an inert gas, as described in greater detail herein.

The hydrocarbon gas may be added 340 to the reaction chamber and a determination 345 may be made as to whether a reducing agent should be added, as described in greater detail herein. If so, the reducing agent may be added 350 to the reaction chamber.

A solvent may be added 355 to the reaction chamber and the various ingredients may be heated 360 in the reaction chamber, as described in greater detail herein. The metal catalyst may be allowed 365 to contact the hydrocarbon gas such that they react to produce the product. The product may be dehydrogenated 370 to produce the graphene. The metal catalyst may be removed 375 from the reaction chamber by any of the methods previously described herein. In addition, the solvent may be removed 380 from the reaction chamber. Removal 380 of the solvent may generally complete in a manner similar to that of the method used for removing the metal catalyst. Thus, the solvent may be removed 380 via the outlet. In some embodiments, insertion of an inert gas into the reaction chamber may cause the solvent to be driven therefrom. In some embodiments, the solvent may be removed 380 at substantially the same time the metal catalyst is removed 375. The graphene may be collected 385 from the porous substrate, as described in greater detail herein.

EXAMPLES

Example 1

First Method of Producing Graphene

A 1 liter steel reactor vessel similar to the vessel described with respect to FIG. 1 will be equipped with a heated jacket and an interior agitation apparatus. 300 ml of mercury will be added to 3.0 grams of sodium carbonate in the reactor vessel. The airspace above the mercury will be evacuated by backfilling the airspace with argon. This process will be repeated three times. A 1:1 mixture of ethyne and methane will be compressed to 90 psi and introduced into the reactor vessel, followed by 300 ml of deoxygenated ethylene glycol. The reactor vessel will be heated to 350° C. for 1 hour. The reactor vessel will be allowed to cool to room temperature and the liquid mercury will be drained for reuse in future reactions. The ethylene glycol will be removed from the reactor vessel and the graphene sheet will be collected from a porous glass substrate in the reactor vessel.

The graphene sheet produced from the reaction will be a pure graphene sheet and will be substantially free of defects, such as graphite deposits. The graphene sheet will thus be very useful in photovoltaic cells because of its ability to absorb photons with energy at every frequency.

Example 2

Second Method of Producing Graphene

A 1 liter steel reactor vessel similar to the vessel described with respect to FIG. 1 will be equipped with a heated jacket and an interior agitation apparatus. 300 ml of mercury will be added to 3.0 grams of sodium carbonate in the reactor vessel. The airspace above the mercury will be evacuated by backfilling the airspace with argon. This process will be repeated three times. A 1:1 mixture of ethyne and methane will be compressed to 120 psi and introduced into the reactor vessel. The reactor vessel will be heated to 350° C. for 1 hour. The reactor vessel will be allowed to cool to room temperature and the liquid mercury will be drained for reuse in future reactions. The graphene sheet will be collected from a porous glass substrate in the reactor vessel.

The graphene sheet produced from the reaction will be a pure graphene sheet and will be substantially free of defects, such as graphite deposits. The graphene sheet will thus be very useful in transparent electrodes because of its high conductivity within the plane of carbon atoms and a free path of an electron within the plane of graphene of about 65 microns at room temperatures.

Example 3

Third Method of Producing Graphene

A 1 liter steel reactor vessel similar to the vessel described with respect to FIG. 1 will be equipped with a heated jacket and an interior agitation apparatus. 300 ml of mercury will be added to 3.0 grams of sodium carbonate in the reactor vessel. The airspace above the mercury will be evacuated by backfilling the airspace with argon. This process will be repeated three times. A 1:1 mixture of ethyne and methane will be compressed to 60 psi and introduced into the reactor vessel. The reactor vessel will be heated to 325° C. for 30 minutes. The reactor vessel will be allowed to cool to room temperature and the liquid mercury will be drained for reuse in future reactions. The graphene sheet will be collected from a porous glass substrate in the reactor vessel.

The graphene sheet produced from the reaction will be a pure graphene sheet containing substantially no graphite deposits thereon. The pure graphene sheet will thus be very useful in high strength materials because the purity of the sheet will be less susceptible to breakdown than conventional graphene-based high strength materials.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, " a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, " a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of producing graphene, the method comprising:
   adding at least one liquid metal catalyst in a reaction chamber;
   adding at least one hydrocarbon gas in the reaction chamber;
   allowing the at least one liquid metal catalyst and the at least one hydrocarbon gas to contact one another to produce a product;
   dehydrogenating the product to produce graphene; and
   removing the at least one liquid metal catalyst from the reaction chamber by straining the at least one liquid metal catalyst through a porous substrate, wherein the graphene dispersed in the liquid metal catalyst is captured by the porous substrate.

2. The method of claim 1, further comprising combining the at least one liquid metal catalyst with at least one additive prior to contacting with the at least one hydrocarbon gas.

3. The method of claim 2, wherein combining comprises combining with sodium carbonate, potassium nitrate, lithium carbonate, potassium carbonate, rubidium carbonate, cesium carbonate, magnesium carbonate, lithium nitrate, sodium nitrate, rubidium nitrate, cesium nitrate, magnesium nitrate, calcium nitrate, strontium nitrate, barium nitrate, zinc nitrate, lead nitrate, copper nitrate, iron nitrate, chromium nitrate, cobalt nitrate, nickel nitrate, titanium nitrate, lithium nitrite, sodium nitrite, rubidium nitrite, cesium nitrite, magnesium nitrite, calcium nitrite, strontium nitrite, barium nitrite, zinc nitrite, lead nitrite, copper nitrite, iron nitrite, chromium nitrite, cobalt nitrite, nickel nitrite, titanium nitrite, lithium chlorite, sodium chlorite, rubidium chlorite, cesium chlorite, magnesium chlorite, calcium chlorite, strontium chlorite, barium chlorite, zinc chlorite, lead chlorite, copper chlorite, iron chlorite, chromium chlorite, cobalt chlorite, nickel chlorite, titanium chlorite, lithium hypochlorite, sodium hypochlorite, rubidium hypochlorite, cesium hypochlorite and magnesium hypochlorite, calcium chlorite, strontium chlorite, barium chlorite, zinc chlorite, lead chlorite, copper chlorite, iron chlorite, chromium chlorite, cobalt chlorite, nickel chlorite, titanium chlorite, lithium hypochlorite, sodium hypochlorite, rubidium hypochlorite, cesium hypochlorite, magnesium hypochlorite, calcium hypochlorite, strontium hypochlorite, barium hypochlorite, zinc hypochlorite, or a combination thereof.

4. The method of claim 1, further comprising placing a reducing agent in the reaction chamber after adding the at least one hydrocarbon gas in the reaction chamber.

5. The method of claim 4, wherein the placing comprises placing methane, ethane, propane, butane, pentane, hexane, hydrogen, lithium, sodium, potassium, rubidium, cesium, magnesium, or a combination thereof.

6. The method of claim 1, further comprising dissolving the hydrocarbon gas in a solvent prior to placing the at least one hydrocarbon gas in the reaction chamber.

7. The method of claim 6, wherein the dissolving comprises dissolving in ethylene glycol, diethylene glycol, triethylene glycol, tetraethylene glycol, glycerol, sorbitol, erythritol, threitol, arabitol, xylitol, ribitol, mannitol, galactitol, fucitol, iditol, inositol, dimethyl carbonate, diethyl carbonate, propylene carbonate, ethylene carbonate, or a combination thereof.

8. The method of claim 1, wherein allowing the at least one metal catalyst and the at least one hydrocarbon gas to contact one another comprises allowing the at least one metal catalyst and the at least one hydrocarbon gas to contact one another at a temperature of about 300° C. to about 400° C.

9. The method of claim 1, wherein adding the hydrocarbon gas comprises adding methane, ethane, ethyne, ethene, carbon monoxide, ethanol, propane, butane, butadiene, pentane, pentene, cyclopentadiene, hexane, cyclohexane, benzene, toluene, carbon dioxide, chloromethane, dichloromethane, chloroform, bromomethane, dibromomethane, bromoform, iodomethane, diodomethane, iodoform, carbon tetrachloride, carbon tetrabromide, or a combination thereof.

10. The method of claim 1, wherein the at least one liquid metal catalyst is a molten metal catalyst.

11. The method of claim 1, wherein adding the at least one liquid metal catalyst comprises adding at least one liquid metal catalyst comprising mercury, bismuth, cesium, gallium, nickel, silver, an alloy thereof, or a combination thereof.

12. The method of claim 1, wherein adding the at least one liquid metal catalyst comprises adding an alloy including a Wood's metal, a Rose's metal, a Field's metal, cerrosafe, cerrolow, or a combination thereof.

13. The method of claim 1, wherein adding the at least one liquid metal catalyst comprises adding an amalgam comprising mercury and at least one of bismuth, potassium, lithium, sodium, rubidium, cesium, magnesium, calcium, strontium, barium, copper, silver, gold, platinum, nickel, palladium, cobalt, rhodium, iridium, iron, ruthenium, rhenium, and wolfram.

14. The method of claim 1, wherein adding the at least one liquid metal catalyst comprises adding an alloy having a melting point equal to or less than about 150° C.

15. The method of claim 1, wherein allowing the at least one liquid metal catalyst and the at least one hydrocarbon gas to contact one another comprises contacting at an interface between the at least one liquid metal catalyst and the at least one hydrocarbon gas, wherein the interface is a substantially horizontal surface with respect to a bottom surface of the reaction chamber.

16. The method of claim 1, wherein allowing the at least one liquid metal catalyst and the at least one hydrocarbon gas to contact one another comprises producing the product by a (2+2+2) cycloaddition reaction.

17. The method of claim 1, wherein dehydrogenating the product comprises producing the graphene containing substantially no defects.

18. A method of producing graphene, the method comprising:
    combining at least one metal catalyst with an additive;
    adding the at least one metal catalyst and the additive into a reaction chamber;
    evacuating any gas in the reaction chamber;
    adding at least one hydrocarbon gas into the reaction chamber;
    adding a solvent into the reaction chamber;
    heating the reaction chamber;
    allowing the at least one metal catalyst and the at least one hydrocarbon gas to contact one another to produce a product;
    dehydrogenating the product to produce the graphene;
    removing the at least one metal catalyst from the reaction chamber;
    removing the solvent from the reaction chamber; and
    collecting the graphene on a porous substrate in the reaction chamber.

19. The method of claim 18, further comprising melting the at least one metal catalyst prior to adding the at least one hydrocarbon gas into the reaction chamber.

20. The method of claim 18, wherein combining comprises combining with sodium carbonate, potassium nitrate, lithium carbonate, potassium carbonate, rubidium carbonate, cesium carbonate, magnesium carbonate, lithium nitrate, sodium nitrate, rubidium nitrate, cesium nitrate, magnesium nitrate, calcium nitrate, strontium nitrate, barium nitrate, zinc nitrate, lead nitrate, copper nitrate, iron nitrate, chromium nitrate, cobalt nitrate, nickel nitrate, titanium nitrate, lithium nitrite, sodium nitrite, rubidium nitrite, cesium nitrite, magnesium nitrite, calcium nitrite, strontium nitrite, barium nitrite, zinc nitrite, lead nitrite, copper nitrite, iron nitrite, chromium nitrite, cobalt nitrite, nickel nitrite, titanium nitrite, lithium chlorite, sodium chlorite, rubidium chlorite, cesium chlorite, magnesium chlorite, calcium chlorite, strontium chlorite, barium chlorite, zinc chlorite, lead chlorite, copper chlorite, iron chlorite, chromium chlorite, cobalt chlorite, nickel chlorite, titanium chlorite, lithium hypochlorite, sodium hypochlorite, rubidium hypochlorite, cesium hypochlorite and magnesium hypochlorite, calcium chlorite, strontium chlorite, barium chlorite, zinc chlorite, lead chlorite, copper chlorite, iron chlorite, chromium chlorite, cobalt chlorite, nickel chlorite, titanium chlorite, lithium hypochlorite, sodium hypochlorite, rubidium hypochlorite, cesium hypochlorite, magnesium hypochlorite, calcium hypochlorite, strontium hypochlorite, barium hypochlorite, zinc hypochlorite, or a combination thereof.

21. The method of claim 18, further comprising placing a reducing agent in the reaction chamber after injecting the at least one hydrocarbon gas in the reaction chamber, wherein the reducing agent comprises one or more of methane, ethane, propane, butane, pentane, hexane, hydrogen, lithium, sodium, potassium, rubidium, cesium, and magnesium.

22. The method of claim 18, wherein removing the at least one metal catalyst comprises straining the at least one metal catalyst through the porous substrate, wherein the graphene that is dispersed in the metal catalyst is captured by the porous substrate.

23. The method of claim 18, wherein adding a solvent comprises adding ethylene glycol, diethylene glycol, triethylene glycol, tetraethylene glycol, glycerol, sorbitol, erythritol, threitol, arabitol, xylitol, ribitol, mannitol, galactitol, fucitol, iditol, inositol, dimethyl carbonate, diethyl carbonate, propylene carbonate, ethylene carbonate, or a combination thereof.

24. The method of claim 18, wherein heating the reaction chamber comprises heating to a temperature of about 300° C. to about 400° C.

25. The method of claim 18, wherein adding the at least one hydrocarbon gas comprises adding methane, ethane, ethyne, ethene, carbon monoxide, ethanol, propane, butane, butadiene, pentane, pentene, cyclopentadiene, hexane, cyclohexane, benzene, toluene, carbon dioxide, chloromethane, dichloromethane, chloroform, bromomethane, dibromomethane, bromoform, iodomethane, diodomethane, iodoform, carbon tetrachloride, carbon tetrabromide, or a combination thereof.

26. The method of claim 18, wherein combining the at least one metal catalyst comprises combining a molten metal catalyst.

27. The method of claim 18, wherein combining the at least one metal catalyst comprises combining at least one metal catalyst including mercury, bismuth, cesium, gallium, nickel, silver, an alloy thereof, or a combination thereof.

28. The method of claim 18, wherein combining the at least one metal catalyst comprises combining an alloy including a Wood's metal, a Rose's metal, a Field's metal, cerrosafe, cerrolow, or a combination thereof.

29. The method of claim 18, wherein combining the at least one metal catalyst comprises combining an amalgam including mercury and at least one of bismuth, potassium, lithium, sodium, rubidium, cesium, magnesium, calcium, strontium, barium, copper, silver, gold, platinum, nickel, palladium, cobalt, rhodium, iridium, iron, ruthenium, rhenium, wolfram.

30. The method of claim 18, wherein combining the at least one metal catalyst comprises combining an alloy having a melting point equal to or less than about 150° C.

31. The method of claim 18, wherein allowing the at least one metal catalyst and the at least one hydrocarbon gas to contact one another comprises contacting at an interface between the at least one metal catalyst and the at least one hydrocarbon gas, wherein the interface is a substantially horizontal surface with respect to a bottom surface of the reaction chamber.

32. The method of claim 18, wherein allowing the at least one metal catalyst and the at least one hydrocarbon gas to contact one another comprises producing the product by a (2+2+2) cycloaddition reaction.

* * * * *